T. GRADY.
FILTER.
APPLICATION FILED MAR. 30, 1916.
1,189,810.
Patented July 4, 1916.
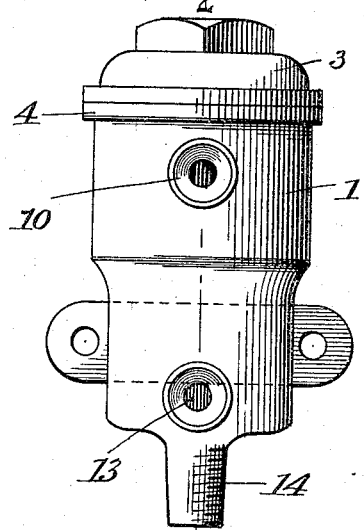
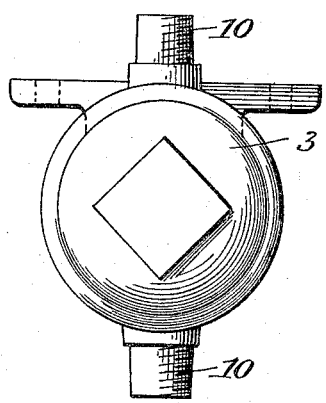
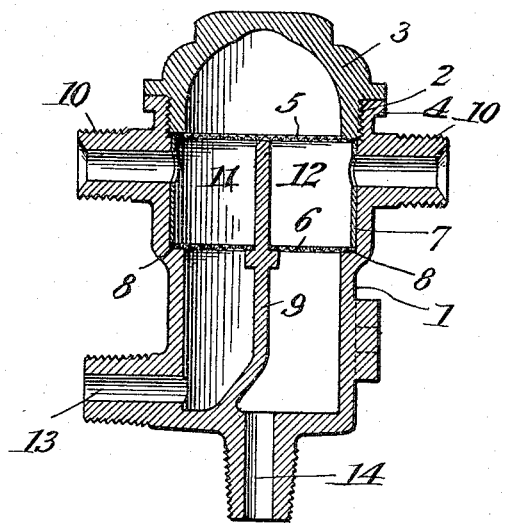
Witnesses
Fenton S. Belt
J. W. Sherwood
Inventor
Thomas Grady
By Frank H. Hoyt
Attorney

UNITED STATES PATENT OFFICE.

THOMAS GRADY, OF ROCHESTER, NEW YORK.

FILTER.

1,189,810. Specification of Letters Patent. Patented July 4, 1916.

Application filed March 30, 1916. Serial No. 87,817.

*To all whom it may concern:*

Be it known that I, THOMAS GRADY, a citizen of the United States, residing at Rochester, in the county of Monroe and State of New York, have invented certain new and useful Improvements in Filters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in filters and it has for its object the provision of an efficient and reliable filter adapted for various purposes and especially designed for filtering gasolene before it passes into the carbureter.

To this end and to such others as the invention may pertain, the same consists in the novel construction of the filter, all as will be more fully hereinafter described, shown in the accompanying drawings and then specifically defined in the appended claims.

My invention is illustrated in the accompanying drawings which, with the numerals of reference marked thereon, form a part of this specification and in which:—

Figure 1 is a side elevation of a filter constructed in accordance with my invention. Fig. 2 is a top plan view, and Fig. 3 is a central vertical section of the same.

Reference now being had to the details of the drawings by numeral, 1 is a cylindrical chamber forming the body portion of the filter. The upper end of said chamber 1 is interiorly screw threaded, as shown at 2, to receive the externally threaded lower end of the cap 3, the outer peripheral edge of which cap has a bearing upon the upper face of the peripheral flange 4 at the extreme upper end of the filter chamber.

5 and 6 are screens secured at the upper and lower ends of the cylindrical compartment 7 fitted within the interior of the filter chamber, the peripheral lower edge of the chamber bearing upon a peripheral shoulder 8 provided for its reception.

9 is a vertically disposed partition extending upward from the lower end of the filter chamber and passing through central openings provided in the screens 5 and 6 and separating the same into two independent chambers 11 and 12 as shown.

10, 10 are inlet passages disposed upon opposite sides of the filter near the top of the same, these inlets communicating with the chambers 11 and 12 between the horizontal screens 5 and 6.

13 and 14 are outlets provided for opposite sides of the filter.

From the foregoing description, the operation of the filter will be at once readily understood. In the use of the filter, it is designed to provide a means whereby the liquid to be filtered may be caused to enter through the inlets upon either the right or left hand side as may be most convenient. If the inlet upon the right side is used, a cap is placed over the inlet upon the left hand side, while, if the inlet upon the left hand side is used, a cap is placed over the inlet upon the right hand side. All liquid entering the filter flows through the screen 5 upward, thence passing downward through the adjacent chamber at the other screen, as indicated in the drawings. In case the liquid enters through the right hand side, it passes upward over the screen 5 on the top, thence downward upon the left hand side and dispenses through the outlet on the left. The outlet not in operation is designed as a drip to draw off any sediment contained in the water that will not readily pass through the upper screen.

While the filter is designed for many different purposes, it is found particularly adapted for use in filtering gasolene used for automobiles and gasolene engines.

What I claim to be new is:—

1. In a filter of the character described, a filter chamber divided by a vertical partition into two independent chambers, two horizontal screens disposed within the upper portion of the chambers, inlets upon opposite sides of the filter communicating with the space intervening between the screens, and outlets for the filter chambers, substantially as shown and described.

2. In a filter of the character described, a filter chamber divided into two vertical chambers, screens disposed horizontally within the chambers, inlets at the upper end of the filter chamber and communicating upon opposite sides thereof with the chambers upon opposite sides of the partition separating the chambers, and outlets to the filter chamber upon opposite sides of the partition separating the chambers, substantially as shown and described.

In testimony whereof I hereunto affix my signature in presence of two witnesses.

THOMAS GRADY.

Witnesses:
CHARLES L. TUTTLE,
ROBERT L. CUNNINGHAM.

Copies of this patent may be obtained for five cents each, by addressing the "Commissioner of Patents, Washington, D. C."